Dec. 13, 1927.
G. W. FISCHER
TOILET SEAT AND COVER
Filed Jan. 21, 1927
1,652,304
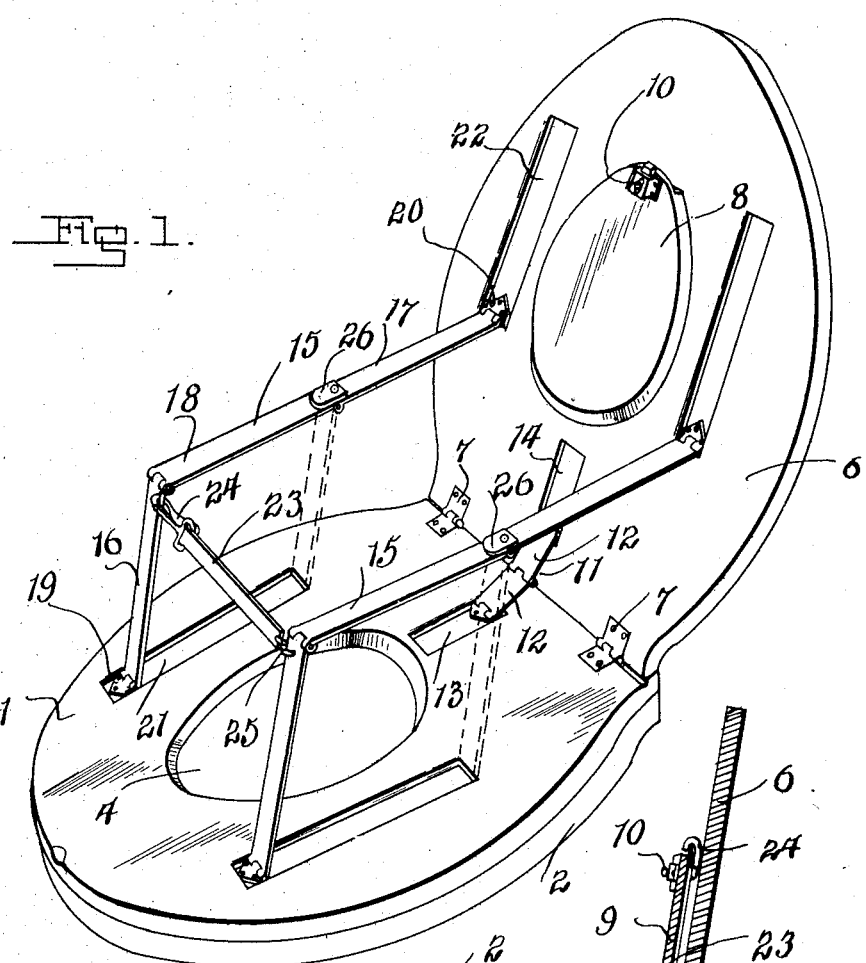
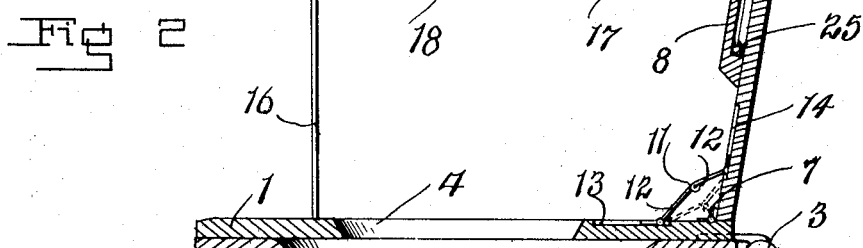
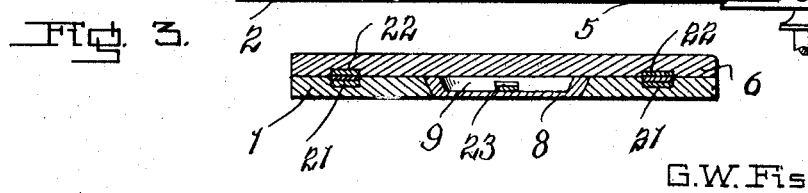
Inventor
G. W. Fischer
By Lacey & Lacey, Attorneys Patented Dec. 13, 1927.

1,652,304

UNITED STATES PATENT OFFICE.

GERVASIUS W. FISCHER, OF MADISON, WISCONSIN.

TOILET SEAT AND COVER.

Application filed January 21, 1927. Serial No. 162,533.

This invention relates to toilets, and more particularly to a combination auxiliary seat and cover which may be used in connection with a toilet seat of a conventional construction. One object of the invention is to provide an auxiliary seat which may be hinged to the usual seat of the toilet and occupied by a baby or small child.

Another object of the invention is to hingedly connect a cover with the auxiliary seat and provide means for releasably latching the auxiliary seat to the cover so that the cover and auxiliary seat may be moved as a unit and the auxiliary seat released from the cover and lowered upon the main seat when it is to be used.

Another object of the invention is to provide an improved latch by means of which the cover may be retained in a raised position and prevented from tilting forwardly and dropping to a closed position prematurely.

Another object of the invention is to provide the auxiliary seat with foldable arms which may be received in companion seats or pockets formed in the cover and auxiliary seat when the cover is closed or in face to face contact with the auxiliary seat and to so form the arms that the length thereof may be controlled when the cover is raised and the auxiliary seat is in an operative position.

The invention is illustrated in the accompanying drawing, wherein,—

Figure 1 is a perspective view showing the cover raised and the auxiliary seat in a lowered operative position.

Figure 2 is a vertical, longitudinal sectional view through the improved seat, with the cover raised.

Figure 3 is a transverse sectional view through the cover.

The auxiliary seat 1 is hingedly connected with the main seat 2 by hinges 3 of a conventional type generally employed to mount the seat and cover of a toilet. The auxiliary seat is of approximately the same size and outline as the main seat 2 and is formed with an opening 4 which is disposed above the opening 5 of the main seat when the auxiliary seat is lowered and is of the proper size for use by a baby or small child. The cover 6 is hinged to the auxiliary seat 1 by conventional hinges 7 and carries a filler 8 which projects from its inner or under face and is of the proper size to fit snugly in the opening 4 of the auxiliary seat. By an inspection of the Figures 2 and 3 it will be seen that the filler has been formed with a recess cut into its inner face and opening through its marginal edge at its upper end. This recess constitutes a pocket 9, the purpose of which will be hereinafter brought out. A latch 10 which is also of a conventional construction is carried by the filler adjacent its upper end and is adapted to engage the under face of the auxiliary seat in order to securely but releasably hold the auxiliary seat in engagement with the cover and prevent the auxiliary seat from dropping when the two are raised as a unit. It is also desired to prevent the cover from accidentally swinging downwardly and striking the head of a baby or small child occupying the auxiliary seat and I have therefore, provided a latch indicated in general by the numeral 11 and consisting of plates 12 which are pivotally connected at their adjacent ends and have their outer ends hinged to the cover and auxiliary seat in recesses 13 and 14 formed therein. By an inspection of Figure 2 it will be seen that when the cover is raised the latch must be forced from the full line position to the dotted line position, and since it passes a dead center the cover will be securely held raised. In order to lower the cover the latch must first be returned to the full line position shown in Figure 2 and the cover may then be swung downwardly. When the cover is closed the plates 12 forming the latch occupy the recesses 13 and 14 and therefore do not interfere with proper closing of the cover.

In order to prevent a baby or small child from losing its balance and falling from the auxiliary seat I have provided arms 15. These arms are of a duplicate construction and each includes forward, rear and intermediate sections 16, 17 and 18 which consist of metal strips hingedly connected at their adjacent ends. The hinges may be formed integral with the strips or may be separate members riveted or otherwise secured thereto. At their outer ends the strips 16 and 17 are hingedly connected to attaching plates 19 and 20 secured in the end portions of the seats or pockets 21 and 22 formed in the auxiliary seat and cover. From an inspection of Figure 3 it will be seen that when the cover is closed, strips forming the arms are snugly received in the pockets of the auxiliary seat and covering and do not interfere with proper closing of the cover. When the cover is first raised the strips or sections 16 remain in the seats 21 and the intermediate sections 18 are disposed vertically, as indicated by dotted lines in Figure 1. This arrangement will provide arms which may be readily grasped by a small child in order to prevent it from falling if it should lose its balance. If a baby is occupying the auxiliary seat the arms 16 and 18 are swung upwardly to the full line position shown in Figure 1 and a safety strap having hooks 24 and 25 at its ends may have its hooks engaged in openings formed in the strips 16. By this arrangement the baby will be very effectively prevented from falling. Flaps 26 are carried by the strip 17 and extend in overlying relation to the hinges connecting the strips 17 and 18 so that there will be no danger of the child's arms being caught and pinched in the hinges between the strips 17 and 18 when the arms are extended. In order to prevent the strap from being misplaced or lost, when not in use, it is stored in the pocket 9 and since the hook 24 is of such size that it can not completely pass into the pocket it will project slightly therefrom, as shown in Figure 2, so that the strap may be easily withdrawn when needed. It will thus be seen that I have provided a combination auxiliary seat and cover which may be used in connection with a main seat of conventional construction and will not detract from the appearance of a bathroom. The auxiliary seat and cover may be supplied with the main seat or may be sold as an accessory to be substituted for the usual cover.

Having thus described the invention, I claim:

1. In a structure of the character described, a main seat, an auxiliary seat hingedly connected with said main seat, a cover hinged to said auxiliary seat, and hingedly connected plates hinged to the joined end portions of the auxiliary seat and cover intermediate the width thereof and adapted to be moved past a dead center after the cover is raised and retain the cover in a raised position.

2. In a structure of the character described, a seat, a cover hinged to said seat, and arms for the seat hinged to the seat and cover and each consisting of end sections hinged to the cover and seat and an intermediate section hinged to the end sections, said sections being adapted to be folded one upon another when the cover and seat are in face to face contact.

3. In a structure of the character described, a seat, a cover hinged to said seat, and arms for the seat hinged to the seat and cover and each formed of a plurality of sections hinged together and adapted to be folded one upon another when the cover and seat are in face to face contact, the cover and seat having longitudinally extending grooves constituting pockets to receive the arms.

4. In a structure of the character described, a seat, a cover hinged to said seat, and arms for the seat hinged to the seat and cover and each formed of a plurality of sections hinged together and adapted to be moved into selected angular relationship to each other when the cover is raised and provide arms of desired length.

5. In a structure of the character described, a main seat having an opening therein, an auxiliary seat hinged to the main seat and formed with an opening smaller than the opening in the main seat, a cover hinged to said auxiliary seat, a filler for the opening in the auxiliary seat carried by said cover and formed with a recess leading from its marginal edge face and providing a pocket between the filler and pocket, arms hinged to said cover and auxiliary seat and foldable between the cover and auxiliary seat, and a guard strap detachably engaged with said arms and adapted to be received in said pocket when removed from the arms.

In testimony whereof I affix my signature.

GERVASIUS W. FISCHER. [L. S.]